United States Patent [19]

Nakase et al.

[11] 4,216,653
[45] Aug. 12, 1980

[54] EXHAUST GAS PURIFYING SYSTEM FOR INTERNAL COMBUSTION ENGINES

[75] Inventors: Takamichi Nakase, Gamagori; Tadashi Hattori, Okazaki; Junichiro Naito, Toyokawa; Kenji Kondo, Aichi, all of Japan

[73] Assignee: Nippon Soken, Inc., Nishio, Japan

[21] Appl. No.: 868,313

[22] Filed: Jan. 10, 1978

[30] Foreign Application Priority Data

Jan. 28, 1977 [JP] Japan ............... 52-8892

[51] Int. Cl.$^2$ .............................. F01N 3/10
[52] U.S. Cl. ........................ 60/276; 60/290
[58] Field of Search ......... 60/276, 274, 285, 289, 60/290; 123/32 EE

[56] References Cited

U.S. PATENT DOCUMENTS

| | | | |
|---|---|---|---|
| 3,768,259 | 10/1973 | Carnahan | 60/285 |
| 3,782,347 | 1/1974 | Schmidt | 123/32 EE |
| 3,900,012 | 8/1975 | Wahl | 123/32 EE |
| 3,962,867 | 6/1976 | Ikeura | 60/290 |
| 4,024,706 | 5/1977 | Adawi | 60/274 |
| 4,121,547 | 10/1978 | Asano | 123/32 EE |

*Primary Examiner*—Douglas Hart
*Attorney, Agent, or Firm*—Cushman, Darby & Cushman

[57] ABSTRACT

An exhaust gas purifying system of the type utilizing a three-way catalyst containing an oxygen storage material includes an electronic control unit for controlling the amount of secondary air supplied to the exhaust system of an internal combustion engine. The electronic control unit receives a signal from an exhaust air-fuel ratio sensor indicative of an air-fuel ratio of the exhaust gases and provides a pulse signal to an electromagnetic valve disposed in the passage of the secondary air leading to the upstream of the three-way catalyst. The amount of secondary air supplied to the exhaust system is controlled such that the resultant exhaust gases having an exhaust air-fuel ratio greater than the stoichiometric ratio and those having an exhaust air-fuel ratio smaller than the stoichiometric ratio are alternately supplied to the three-way catalyst thereby to achieve the average exhaust air-fuel ratio to fall within the optimum purifying conditions of the three-way catalyst.

4 Claims, 11 Drawing Figures

EXHAUST GAS PURIFYING SYSTEM FOR INTERNAL COMBUSTION ENGINES

BACKGROUND OF THE INVENTION

The present invention relates to exhaust gas purifying systems for internal combustion engines, and more particularly the invention relates to an exhaust gas purifying system in which secondary air is supplied to the exhaust gases flowing into a three-way catalyst containing an oxygen storage material in such a manner that the resulting average exhaust air-fuel ratio is optimum for purification of the noxious components in the exhaust gases.

Generally, there is a close relationship between the noxious component purification percentages of an exhaust gas reactor and the exhaust air-fuel ratio (the weight ratio of the sum of the amount of air drawn into the engine and the amount of secondary air to the amount of fuel supplied). For example, where a three-way catalyst is used which removes the noxious components in exhaust gases by oxidizing CO and HC and reducing $NO_x$ with the same catalyst layer as a medium, its purification characteristic in relation to the exhaust air-fuel ratios becomes as shown in FIG. 1.

Consequently, in order that the three-way catalyst in the form of an exhaust gas reactor of the above type may be operated with high efficiency, the exhaust air-fuel ratio must be maintained in the narrow hatched region shown in FIG. 1.

In view of these circumstances, a system has been proposed in which the oxygen content of the exhaust gases which is closely related to the exhaust air-fuel ratio, is detected by an air-fuel ratio sensor, whereby the amount of secondary air supplied into the intake system or the exhaust system is continuously controlled at a constant speed and the exhaust air-fuel ratio is maintained constant.

However, the control system of this type is disadvantageous in that since the air-fuel ratio must be maintained at a constant value within a narrow range, the construction of the system tends to become complicated and the degree of freedom of the system also tends to be reduced.

SUMMARY OF THE INVENTION

It is an object of the present invention to provide an exhaust gas purifying system efficient in a wide range of exhaust air-fuel ratios. In the present invention noting the oxygen ($O_2$) absorption and discharging function in the catalyst bed by its oxygen storage material, secondary air is intermittently supplied to cause the exhaust air-fuel ratio to swing on both sides of the stoichiometric ratio by an amount greater than a predetermined value. Thus, the exhaust gases with an air-fuel ratio greater than the stoichiometric ratio and the exhaust gases with an air-fuel ratio smaller than the stoichiometric ratio are alternately supplied to the three-way catalyst with the result that the oxygen ($O_2$) is stored, in a microscopic sense, in the catalyst in the oxidation atmosphere with a large exhaust air-fuel ratio thus increasing the purification efficiency of $NO_x$, whereas in the reducing atmosphere with a small exhaust airfuel ratio the purification efficiency of CO and HC is increased by causing oxidation reaction between the stored $O_2$ and CO and HC. The range in which high purification percentages can be ensured is thereby increased, as is the degree of freedom of the system. The system of this invention has among its great advantages the fact that since the amount of secondary air is feedback compensated in such a manner that the exhaust gases with a large exhaust air-fuel ratio and the exhaust gases with a small exhaust air-fuel ratio are alternately supplied to the three-way catalyst, increased purification percentages are ensured for the exhaust gases having the average exhaust air-fuel ratios which are larger (leaner) and smaller (richer) than the stoichiometric ratio and thereby increasing the range in which high purification percentages can be ensured and increasing the degree of freedom of the system.

Another advantage is that by using the first and second integrator circuits, converter circuit and pulse width modulator circuit for controlling purposes and controlling the electromagnetic valve with the pulse signal the rate of change of the duty cycle of which is compensated in accordance with the engine performance characteristic, it is possible to cause the exhaust air-fuel ratio to always vary practically to each side of the stoichiometric ratio by a predetermined amount throughout a wide range of the operating conditions of the engine. The operation of the three-way catalyst containing an oxygen storage material is disclosed in detail in the prior copending application Ser. No. 863,579 filed by Nakase et al on Dec. 12, 1977.

DESCRIPTION OF THE PREFERRED EMBODIMENTS

The present invention will now be described in greater detail with reference to the illustrated embodiments.

Figure 2:
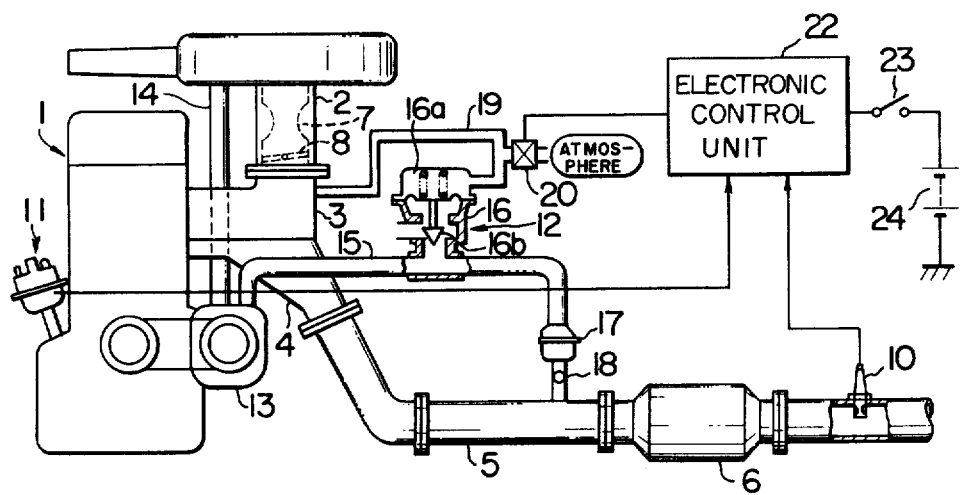
FIG. 2 is a schematic diagram showing an embodiment of the invention.

Referring first to FIG. 2 showing the general construction of an embodiment of the invention, an internal combustion engine 1 is an ordinary four-cycle reciprocating engine, and the mixture produced in a carburetor 2 is supplied to the engine 1 by way of an intake manifold 3. The exhaust gases resulting from the burning of the mixture are discharged into an exhaust manifold 4 and an exhaust pipe 5, and the exhaust gases are discharged to the atmosphere after the noxious components, such as, $NO_x$, CO and HC have been removed by a three-way catalyst containing an oxygen storage material, e.g., cerium oxide ($C_2O$).

The carburetor 2 is of the ordinary type having a venturi 7 and a throttle valve 8 and it is adjusted to produce a mixture richer than the stoichiometric air-fuel ratio.

An air-fuel ratio sensor 10 mounted in the exhaust pipe 5 downstream of the three-way catalyst 6 is designed to detect the exhaust gas components, particularly the oxygen content and generate an electric signal in accordance with the exhaust air-fuel ratio closely related to the oxygen content. Sensor 10 suitably comprises a detecting element employing, as a principal component, an oxygen ion conductive solid electrolyte, such as, zirconia ($ZrO_2$) or semiconducting metal oxide, such as, titania ($TiO_2$). Where the detector uses zirconia, for example, the detector generates an electromotive force in the range 1000 to 800 mV when the exhaust air-fuel ratio is richer than the stoichiometric ratio, and the detector generates an electromotive force in the range 200 to 0 mV when the exhaust airfuel ratio is leaner than the stoichiometric ratio.

Figure 3:
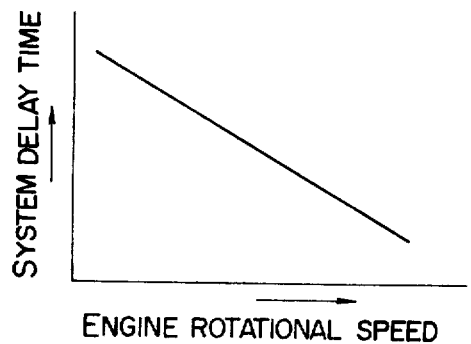
FIG. 3 is a graph showing the relationship between the system delay time and the engine rotational speed.

An engine speed sensor 11 generates an electric signal in response to the rotational speed of the crankshaft of the engine 1. In the preferred embodiment of the present invention engine speed sensor 11 comprises the ignition distributor which generates a pulse signal having a frequency proportional to the engine speed. In this embodiment, there is a functional relation between the engine speed and the delay time of the control system as shown in FIG. 3, and the engine speed sensor 11 constitutes a performance characteristic sensor for the engine 1.

A secondary air supply unit 12 comprises an air pump 13, secondary air supply pipes 14 and 15, a control valve 16, a check valve 17, a secondary air injection nozzle 18, a vacuum delivery pipe 19 and an electromagnetic valve 20. The air pump 13 is of the vane type or the diaphragm type and is driven from the engine 1 by means of a V-belt. Secondary air is delivered under pressure from the air pump 13 through the air cleaner, the secondary air supply pipes 14 and 15, the control valve 16 and the check valve 17 to the injection nozzle 18 which in turn injects the secondary air into the exhaust pipe 5.

The control valve 16 is of the ordinary diaphragm type which is operable in response to the intake vacuum, so that when the intake vacuum is introduced into a pressure chamber 16a through the pipe 19, a needle 16b is opened in response to the magnitude of the intake vacuum and the secondary air allowed to escape to the atmosphere. When the atmospheric pressure is introduced into the pressure chamber 16a, the needle 16b is closed and the secondary air is supplied to the injection nozzle 18. The electromagnetic valve 20 is connected to the pipe 19 to control the intake vacuum applied to the pressure chamber 16a, so that when it is closed, the intake vacuum is introduced into the pressure chamber 16a, and when it is opened the intake vacuum is allowed to escape into the atmosphere. In this way, when the electromagnetic valve 20 is opened, the secondary air is supplied into the exhaust gases in accordance with the intake vacuum or the intake air quantity, and when the electromagnetic valve 20 is closed the supply of the secondary air is practically stopped.

In this embodiment, the rate of supply of secondary air is preset so that the exhaust air-fuel ratio is caused to alternately become greater and smaller than a specific reference value in response to the supply of secondary air.

An electronic control unit 22 receives as its input signals the output signals of the air-fuel ratio sensor 10 and the engine speed sensor 11, so that in response to these input signals, a signal having a variable duty cycle and frequency is generated. The variable duty cycle signal is applied to the electromagnetic valve 20 for feedback compensating the exhaust air-fuel ratio, thus controlling the on-off operations of the electromagnetic valve 20 and thereby controlling the average value of the exhaust air-fuel ratios to attain the stoichiometric ratio corresponding to the optimum purification condition. The electronic control unit 22 is connected to a DC power source 24, e.g., the battery through an ignition key switch 23 of the engine 1.

Figure 4:
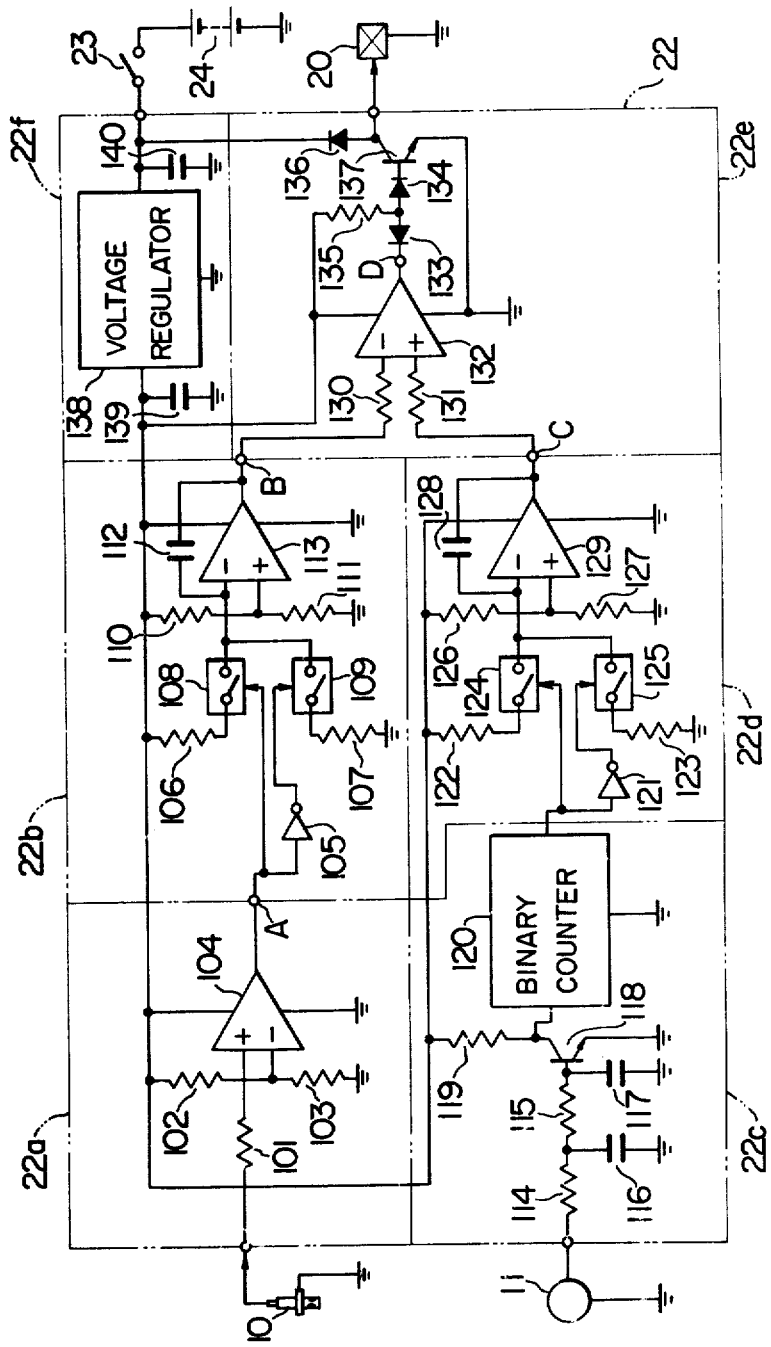
FIG. 4 is a circuit diagram of the electronic control unit shown in FIG. 2.

Next, the electronic control unit 22 will be described in detail with reference to FIG. 4. The electronic control unit 22 comprises a comparison circuit 22a, a first integrator circuit 22b, a converter circuit 22c, a second integrator circuit 22d, a pulse width modulator circuit 22e and a constant voltage circuit 22f.

The comparison circuit 22a is a circuit which compares the output signal of the air-fuel ratio sensor 10 with a preset value to discriminate whether the output signal is greater than the preset valve. Comparison circuit 22a suitably comprises an input resistor 101, voltage dividing resistors 102 and 103 for generating a voltage corresponding to the preset value, and a comparator 104. Thus, when the exhaust air-fuel ratio is richer (smaller) than a preset air-fuel ratio, the output at a terminal A goes to a "1" level, and the output at the terminal A goes to a "0" level when the exhaust air-fuel ratio is leaner (larger) than the preset air-fuel ratio.

The first integrator circuit 22b is a circuit which receives and integrates the output signal of the comparison circuit 22a to generate an integration signal of a fixed time constant. First integrator circuit 22b comprises an inverter 105, resistors 106 and 107 and a capacitor 112 for presetting the time constant of the integration signal, analog switches 108 and 109 for respectively connecting and disconnecting the resistors 106 and 107, an operational amplifier 113 and voltage dividing resistors 110 and 111 for determining a central operating point of the integration signal. In this embodiment, the resistance values are selected so that the resistor 106 is equivalent to the resistor 107 and the resistor 110 is equivalent to the resistor 111. Thus, when the output of the comparison circuit 22a goes to the "1" level, the analog switch 108 is turned on and the analog switch 109 is turned off, with the result that the operational amplifier 113 comes into operation with the time constant preset by the resistor 106 and the capacitor 112 and the output at a terminal B decreases. Conversely, when the output of the comparison circuit 22a changes from the "1" level to the "0" level as shown by the broken line $A_1$ or $A_2$ in FIG. 5, the analog switch 109 is turned on and the analog switch 108 is turned off, with the result that the operational amplifier 113 comes into operation with the time constant preset by the resistor 107 and the capacitor 112 and the output at the terminal B increases. Thus, the output at the terminal B has a sawtooth waveform as shown by the broken line $B_1$ or $B_2$ in FIG. 5.

The converter circuit 22c is a circuit which receives the pulse signal from the engine speed sensor 11 to generate a pulse signal having a frequency corresponding to the input pulse signal, and it comprises a waveform reshaping circuit including resistors 114, 115 and 119, capacitors 116 and 117 and a transistor 118 and a frequency divider circuit 120 including a binary counter. The signal from the engine speed sensor 11 is reshaped into a rectangular pulse signal by the waveform reshaping circuit. The rectangular pulse signal is divided to a desired frequency by the frequency divider circuit 120 which also adjusts the duty cycle to 50%.

The second integrator circuit 22d is a circuit which is similar to the first integrator circuit 22b, namely, it receives and integrates the output signal of the converter circuit 22c to generate an integration signal with a fixed time constant. Second integrator circuit 22b comprises an inverter 121, resistors 122 and 123 and a capacitor 128 for presetting the time constant of the integration signal, analog switches 124 and 125 for respectively connecting and disconnecting the resistors 122 and 123, an operational amplifier 129 and resistors 126 and 127 for determining the central operating point of the integration signal. In this embodiment, the resistance values are preset so that the resistor 122 is equivalent to the resistor 123 and the resistor 126 is equivalent to the resistor 127. Thus, when the output of the converter circuit 22c goes to the "1" level, the analog switch 124 is turned on and the analog switch 125 is turned off, with the result that the operational amplifier 129 comes into operation with the time constant determined by the resistor 122 and the capacitor 128 and the output at a terminal C decreases. Conversely, when the output of the converter circuit 22c goes from the "1" level to the "0" level, the analog switch 125 is turned on and the analog switch 124 is turned off, with the result that the operational amplifier 129 comes into operation with the time constant determined by the resistor 123 and the capacitor 128 and the output at the terminal C increases. In this way, the output at the terminal C takes the form of a sawtooth waveform with a short period as shown by the broken line $C_1$ or $C_2$ in FIG. 5. In other words, at the terminal C is generated a sawtooth waveform whose frequency and amplitude are varied in accordance with the engine rotational speed which is one of the performance characteristics of the engine 1.

The pulse width modulator circuit 22e is a circuit whereby the output signals of the first and second integrator circuits 22b and 22d are subjected to pulse modulation. The on-off operation of the electromagnetic valve 20 is controlled by the resulting modulated signal. Pulse width modulator circuit 22e comprises input resistors 130 and 131, a comparator 132, diodes 133, 134 and 136, a resistor 135 and a transistor 137. The output signal of the first integrator circuit 22b is applied to the inverting input terminal of the comparator 132 whose noninverting input terminal receives the output signal of the second integrator circuit 22d. The output of the comparator 132 at its output terminal D has a waveform as shown by the broken line $D_1$ or $D_2$ in FIG. 5, so that when the output goes to the "1" level, the transistor 137 is turned on and the electromagnetic valve 20 is opened, whereas when the output goes to the "0" level, the transistor 137 is turned off and the electromagnetic valve 20 is closed.

The constant voltage circuit 22f comprises a voltage regulator 138 and capacitors 139 and 140, and controls the voltage from the DC power source 24 to a constant voltage and applies it to the individual circuits.

With the construction described above, the carburetor 2 supplies to the engine 1 a mixture which is richer than the stoichiometric air-fuel ratio, and the engine 1 discharges the exhaust gases having the low oxygen content. This oxygen content is detected by the air-fuel ratio sensor 10 mounted in the exhaust pipe 5, and consequently the comparison circuit 22a of the electronic control circuit 22 generates a "1" level signal. The output of the comparator 132 in the pulse width modulator circuit 22e takes the form of a signal (control pulses) whose duty cycle increases gradually as shown by the waveform $D_1$ or $D_2$ in FIG. 5, and consequently the duration of opening of the electromagnetic valve 20 is increased with time. As a result, the control valve 16 tends to close so that the amount of the secondary air permitted to escape is reduced and the supply of the secondary air into the exhaust pipe 5 is increased, thus increasing the exhaust air-fuel ratio.

Figure 1:
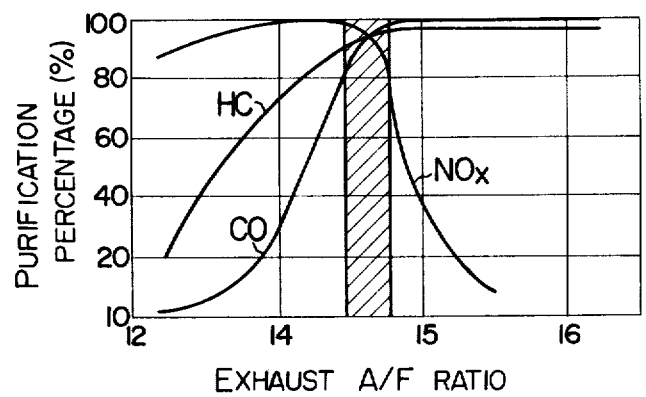
FIG. 1 is a graph showing a purification characteristic of a three-way catalyst.

When the exhaust air-fuel ratio is increased, this is detected by the air-fuel ratio detector 10, and consequently the comparison circuit 22a of the electronic control unit 22 generates a "0" level signal. When this occurs, comparator 132 of the pulse width modulator circuit 22e generates an output signal (control pulses) whose duty cycle is gradually decreased as shown in the middle portion of the waveform $D_1$ in FIG. 1, and the duration of closing of the electromagnetic valve 20 is increased with time.

As a result, the intake vacuum is introduced into the pressure chamber 16a and the control valve 16 is operated in a direction which opens it, thus increasing the amount of the secondary air permitted to escape and thereby decreasing the amount of the secondary air supplied into the exhaust pipe 5.

In this way, the exhaust gases with a small exhaust air-fuel ratio and the exhaust gases with a large exhaust air-fuel ratio alternately flow into the three-way catalyst 6, that is, the exhaust gases flow into the three-way catalyst 6, namely, the exhaust gases flow into the three-way catalyst 6 whose exhaust air-fuel ratio varies about the stoichiometric ratio by an amount greater than ±0.5 and at a certain frequency.

Figure 6:
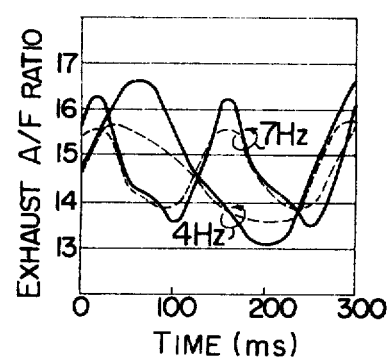
FIG. 6 is a graph showing the variations of the exhaust air-fuel ratio.
Figure 7:
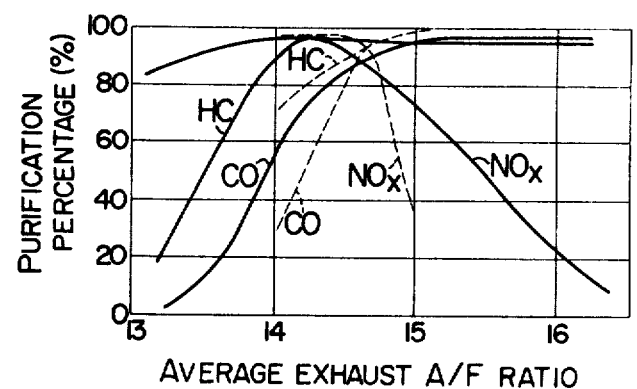
FIG. 7 is a graph showing a purification characteristic of a three-way catalyst.

FIG. 6 shows the variations of the exhaust air-fuel ratio at the frequencies of 4 Hz and 7 Hz, respectively. In FIG. 6 the solid lines indicate the variations measured at the inlet of the three-way catalyst 6, and the dotted lines indicate those measured at the outlet of the three-way catalyst 6. In FIG. 6, it is the mixing in the catalyst bed that causes the amount of variation of the exhaust air-fuel ratio at the inlet of the three-way catalyst to differ from that at the outlet of the three-way catalyst. In the oxidation atmosphere with a large exhaust air-fuel ratio, oxygen ($O_2$) is adsorbed into the catalyst in a microscopic sense so that a reducing atmosphere is produced on the catalyst surface and the purifying efficiency of $NO_x$ is enhanced. On the other hand, in the reducing atmosphere with a small exhaust air-fuel ratio, oxidation reaction occurs between the $O_2$ adsorbed in the catalyst and CO and HC in the exhaust gases, and the purification efficiency of CO and HC is enhanced. These are shown in FIG. 7 in which the solid lines indicate the purification performance of the three-way catalyst used in the system of this embodiment, and the dotted lines indicate the purification performance of the three-way catalyst in the prior art system. As will be seen from FIG. 7, the purification percentages of the system of this embodiment deteriorate somewhat as compared with those of the prior art system when the average exhaust air-fuel ratio is at around the stoichiometric ratio. However the average exhaust gas air-fuel ratio is greater (leaner) or smaller (richer) than the stoichiometric ratio, the purification percentages are enhanced as compared with those of the prior art system, thus increasing the range in which high purification percentages can be maintained. Thus, the degree of freedom of the system is increased making it possible to always operate the three-way catalyst 6 in the high purification percentage area. Also the experiments conducted have shown that in order that the oxygen adsorption action may be effected satisfactorily, it is desirable that the amount of variation of air-fuel ratio to each side of the stoichiometric ratio be greater than ±0.5 for the exhaust gases with smaller air-fuel ratios and the exhaust gases with greater air-fuel ratios at the inlet of the three-way catalyst 6. As a result, it is necessary to either reduce the distance from the opening of the injection nozzle 18 to the inlet of the three-way catalyst 6 to prevent the amount of variation of the air-fuel ratio due to the mixing; or to preset the air-fuel ratio of mixture or the ratio of the secondary air quantity to the intake air quantity in consideration of reduction in the variation of the air-fuel ratio due to the mixing.

Figure 5:
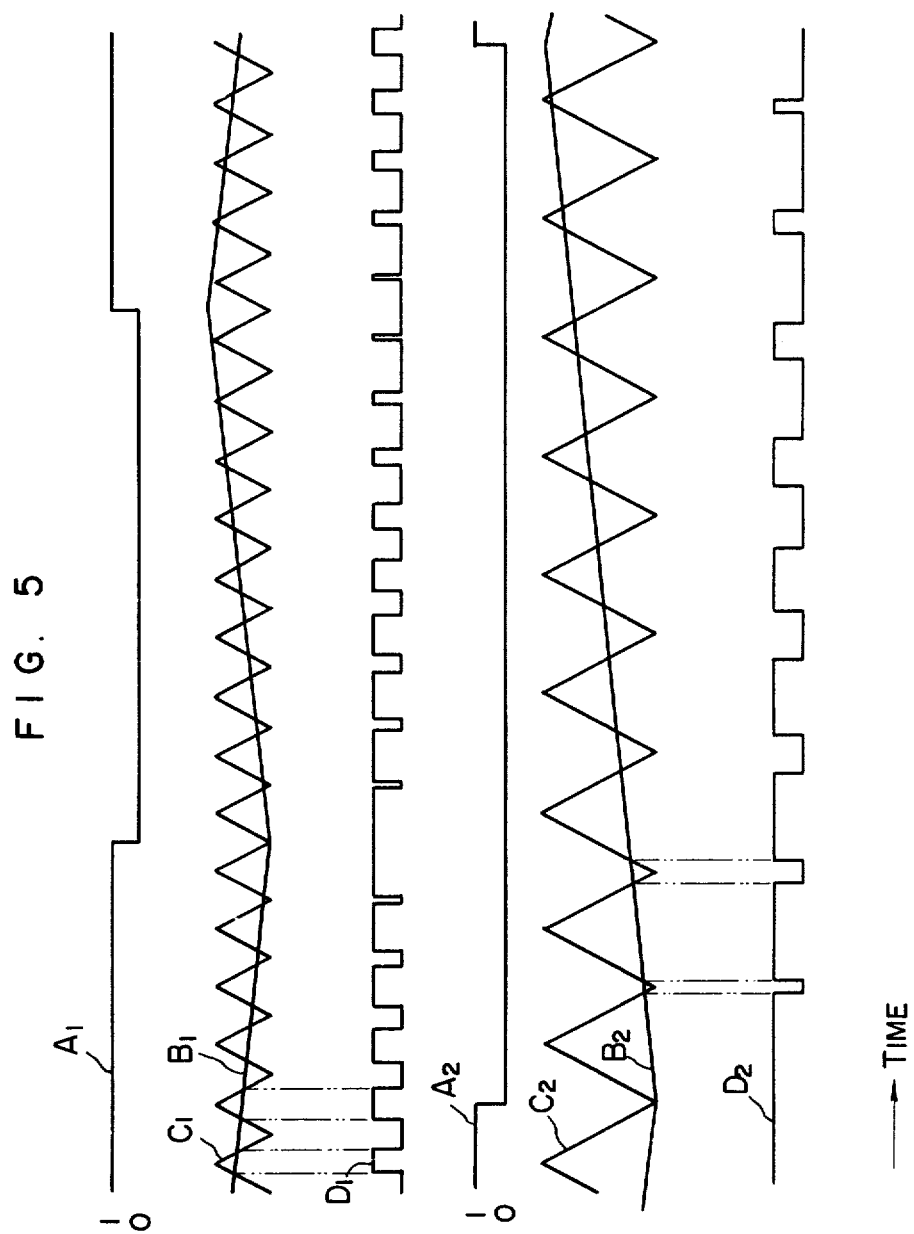
FIG. 5 is a waveform diagram useful for explaining the operation of the electronic control unit shown in FIG. 4.

When the rotational speed of the engine 1 is low, the frequency of the output pulse signal of the converter circuit 22c is low, and consequently the second integrator circuit 22d adapted for integrating the pulse signal generates a sawtooth waveform having a high amplitude and a low frequency as shown by the waveform $C_2$ in FIG. 5. Also in this case, the flow rate of the exhaust gases is decreased and the delay time of the control system is increased, with the result that the period of changes in the output of the air-fuel ratio sensor 10 is increased and the first integrator circuit 22b generates a sawtooth waveform as shown by the waveform $B_2$ in FIG. 5. The sawtooth waveforms shown by the waveforms $B_2$ and $C_2$ are applied to the pulse width modulator circuit 22c which in turn generates a pulse signal whose duty cycle is varied slowly. That, as shown in waveform $D_2$ the rate of change of the duty cycle of the pulse signal is low.

When the rotational speed of the engine 1 increases, the frequency of the output pulse signal of the converter circuit 22c increases. The second integrator circuit 22d generates a sawtooth waveform whose amplitude decreases in inverse proportion to the engine speed and whose frequency increases in proportion to the engine speed as shown by the waveform $C_1$ in FIG. 5. In this case, the flow rate of the exhaust gases increases and the delay time of the control system decreases. Accordingly, the output of the air-fuel ratio sensor 10 changes at a shorter period and the first integrator circuit 22b generates a sawtooth waveform as shown by the waveform $B_1$ in FIG. 5. The sawtooth waveforms shown by the waveforms $B_1$ and $C_1$ are applied to the pulse width modulator circuit 22e, which in turn generates a pulse signal whose duty cycle varies rapidly, that is, the rate of change of the duty cycle the pulse signal shown in the waveform $D_1$ is high.

In this way, the rate of change of the duty cycle of the pulses for controlling the electromagnetic valve 20 is compensated in response to the rotational speed of the engine 1, namely, the low rate of change of the duty cycle means that the rate of change in the duration of opening or closing of the electromagnetic valve 20 is low, and the high rate of change of the duty cycle means that the rate of change in the duration of opening or closing of the valve is high.

When the intake vacuum of the engine 1 is constant and the rate of change of the duty cycle is high, the speed of variation of the vacuum signal for controlling the opening and closing of the control valve 16 is also increased with the resulting increase in the speed at which the supply of secondary air is compensated. Conversely, when the rate of change of the duty cycle is low, the speed of compensating the supply of secondary air is decreased. Thus, even if the rotational speed of the engine 1 is decreased and the system delay time is increased, the rate of change in the duty cycle of the pulse signal for controlling the electromagnetic valve 20 is decreased. The speed of compensating the supply of secondary air is also decreased, thus maintaining the variations of the exhaust air-fuel ratio within a predetermined range irrespective of the system delay time.

Thus, it is possible to provide control so that the amount of variation of the exhaust air-fuel ratio is prevented from becoming excessively large under low load and speed conditions of the engine 1, and the amount of variation of the exhaust air-fuel ratio is prevented from becoming excessively small under high load and speed conditions of the engine 1, thus allowing the three-way catalyst to effectively perform the oxygen adsorption and discharging action.

Figure 8:
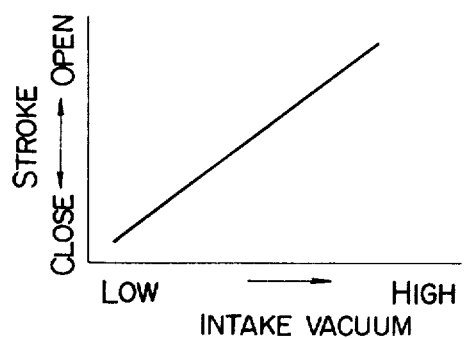
FIGS. 8 and 9 are graphs showing control characteristics of the control valve shown in FIG. 2.
Figure 9:
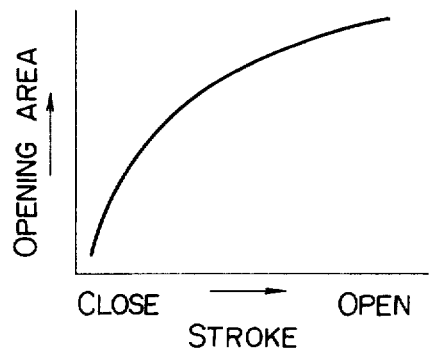

In this case, if the stroke of the needle 16b is preset in relation to the intake vacuum introduced into the pressure chamber 16a, as shown in FIG. 8, the operating speed will be affected by the intake vacuum. Consequently from the standpoint of keeping the exhaust air-fuel ratios within a predetermined range against variations of the engine speed and intake vacuum, it is desirable to modify the shape of the valve seat associated with the needle 16b and preset the resulting opening area as shown in FIG. 9 so that the rate of change of the opening area is decreased when the intake vacuum is high, and the rate of change of the opening area is increased when the intake vacuum is low.

Figure 10:
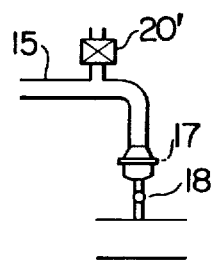
FIG. 10 is a schematic diagram showing the principal part of another embodiment of the invention.
Figure 11:
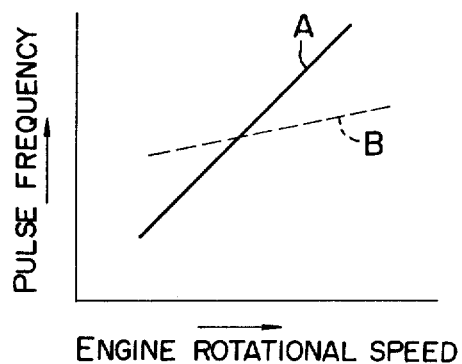
FIG. 11 is a graph showing a control characteristic of still another embodiment of the invention.

Further, while, in the embodiment described above, the intake vacuum applied to the control valve 16 is controlled by the electromagnetic valve 20 so as to control the supply of secondary air, as shown in FIG. 10 illustrating the principal part of a second embodiment of the invention, an electromagnetic valve 20' may be mounted in the secondary air supply pipe 15 to allow the secondary air to escape to the atmosphere therethrough and thereby to control the rate of supply of the secondary air.

Further, while the engine speed sensor 11 is used as a performance characteristic sensor for the engine 1 which is related to the system delay time, of the engine operation, it is also possible to use any of other sensors adapted to detect operational factors, such as the intake vacuum, throttle opening, intake air flow, exhaust gas flow rate and the like as a function of delay time of the engine operation.

Still further, while it is so arranged that the ignition signal is subjected to waveform reshaping and frequency division in the conversion circuit 22c and the resulting divided signal is applied to the second integrator circuit 22d, it is only necessary to arrange so that the amounts of modulation of the amplitude and frequency of the sawtooth waveform correspond to the system delay time characteristic of an engine, and consequently a smoothing circuit and a V-F converter circuit may be used in place of the frequency divider circuit and these circuits may be adjusted in such a manner that any desired amount of modulation is obtained with respect to the amount of modulation A of the frequency divided signal and the resulting output becomes as shown by the straight line B in FIG. 10, thus ensuring the maximum conformity.

We claim:

1. A secondary-air control system for an internal combustion engine wherein secondary-air is intermittently supplied to the exhaust system of the engine upstream of a three-way catalyst containing an oxygen storage material so that the exhaust air-fuel ratio swings, on both rich and lean sides of a stoichiometric ratio alternately, said secondary-air control system comprising:

an air-fuel ratio sensor located downstream of said three-way catalyst for detecting the oxygen content of the exhaust gases supplied with secondary air to generate a signal indicative of the air-fuel ratio of the exhaust gases;

an engine speed sensor for generating an engine speed signal indicative of a delay time of the engine operation;

an electronic control unit responsive to said air-fuel ratio signal and said engine speed signal, for generating a control pulse signal, said electronic control unit including:

a comparison circuit, connected to said air-fuel ratio sensor, for comparing said air-fuel ratio signal with a preset value and for generating a high or a low level signal depending on whether said air-fuel ratio signal is above or below said preset value;

a first integrator circuit connected to said comparison circuit for integrating said high or low level signals to produce a first sawtooth wave signal;

a converter circuit connected to said engine speed sensor for generating a pulse signal having a frequency corresponding to engine speed;

a secondary integrating circuit connected to said converter circuit for integrating said pulse signal from said converter circuit to a second sawtooth wave signal having a frequency and an amplitude varied in accordance with the engine speed;

a pulse width modulator circuit connected to said first and said second integrator circuit for pulse-modulating said first and said second sawtooth wave signal to produce said control pulse signal, said control pulse signal having a duty cycle gradually increasing in response to said comparator circuit delivering said high level signal indicative of the air-fuel ratio being above the predetermined value, gradually decreasing in response to said comparator circuit delivering said low level signal indicative of the air-fuel ratio being below the predetermined value; and control valve means including an electromagnetic valve connected to receive said control pulse signal and associated with a secondary air supply system, said control valve means being actuated by said control pulse signal to intermittently supply the secondary air in accordance with said control pulse signal having a varying duty cycle.

2. A system as set forth in claim 1 wherein said electronic control unit further includes means for controlling the exhaust air-fuel ratio such that the exhaust air-fuel ratio is alternately varied to each side of said stoichiometric ratio by an amount greater than 0.5.

3. An exhaust gas purifying system for an internal combustion engine comprising:

secondary air supply means for supplying secondary air into an exhaust system of an internal combustion engine;

a three-way catalyst containing an oxygen storage material for removing noxious components from the exhaust gases of said engine;

an air-fuel ratio sensor for detecting the oxygen content of the exhaust gases supplied with secondary air to generate a signal indicative of the air-fuel ratio of the exhaust gases;

an electromagnetic valve disposed in said secondary air supply means for controlling the supply of the secondary air;

an electronic control unit responsive to the output signal of said air-fuel ratio sensor and generating control pulses to operate said electromagnetic valve so as to intermittently supply the secondary air in such a manner that the exhaust air-fuel ratio is alternately varied practically to each side of a stoichiometric air-fuel ratio by an amount greater than a predetermined value, the improvement wherein said system further comprises:

means responsive to one of operational factors as a function of delay time of the engine operation and generating a time delay signal;

and said electronic control unit includes:

a comparison circuit for comparing the output signal of said air-fuel ratio sensor with a preset value to generate a signal indicative of the result thereof;

a first integrator circuit for integrating the output signal of said comparison circuit;

a converter circuit responsive to said time delay signal for generating a pulse signal;

a second integrator circuit for integrating the output signal of said converter circuit; and a pulse width modulator circuit for subjecting the output signals of said first and second integrator circuits to pulse modulation and generating said control pulses;

the frequency of said control pulses being in accordance with the delay time of the engine operation and the duty cycle of said control pulses gradually increasing or decreasing in response to said output signal from said air-fuel ratio sensor.

4. A system as set forth in claim 3, wherein the exhaust air-fuel ratio is controlled by said electronic control unit, whereby the exhaust air-fuel ratio is alternately varied practically to each side of said stoichiometric ratio by an amount greater than 0.5.

* * * * *